United States Patent [19]

Clark et al.

[11] 3,755,325

[45] Aug. 28, 1973

[54] IMIDAZOLIUM QUATERNARY SALTS AND METHODS OF PREPARING THE SAME

[75] Inventors: Robert L. Clark, Woodbridge; Arsenio A. Pessolano, Colonia, both of N.J.

[73] Assignee: Merck & Co., Inc., Rahway, N.J.

[22] Filed: Aug. 31, 1971

[21] Appl. No.: 176,679

Related U.S. Application Data

[63] Continuation of Ser. No. 806,719, March 12, 1969, abandoned.

[52] U.S. Cl............ 260/256.4 N, 260/309, 424/251
[51] Int. Cl............................................. C07d 51/42

[56] References Cited
UNITED STATES PATENTS
3,030,364   4/1962   Rogers et al..................... 260/256.4

FOREIGN PATENTS OR APPLICATIONS
6,624   3/1965   Japan
16,554   7/1965   Japan

Primary Examiner—Alex Mazel
Assistant Examiner—R. V. Rush
Attorney—I. Louis Wolk, J. Jerome Behan and Hesna J. Pfeiffer

[57] ABSTRACT

Imidazolium quaternary salts, specifically 3-(2-loweralkyl-4-amino-5-pyrimidinylmethyl)-1,2-dialkyl substituted imidazolium quaternary salts, having anticoccidial activity are provided.

4 Claims, No Drawings

IMIDAZOLIUM QUATERNARY SALTS AND METHODS OF PREPARING THE SAME

This is a continuation of Ser. No. 806,719, filed Mar. 12, 1969 and now abandoned.

This invention relates to novel imidazolium quaternary salts, specifically, to 3-(2-lower alkyl-4-amino-5-pyrimidinylmethyl)-1,2-disubstituted imidazolium quaternary salts and methods of preparing the same.

According to the present invention it has been found that 3-(2-lower alkyl-4-amino-5-pyrimidinylmethyl)-1,2-dilower alkyl imidazolium quaternary salts have useful medicinal properties and are particularly suitable for use in the treatment and prevention of coccidiosis in poultry.

The compounds with which this invention is concerned may be represented by the general formula

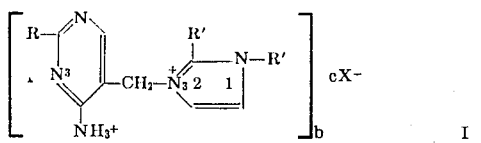

wherein R is a lower alkyl radical, R' is a lower alkyl radical, X is an anion, and $b$ and $c$ are positive numbers having values such that the positive charge of $b$ moles of cation is neutralized by $c$ moles of anion X. Thus, for example, when X is a monovalent anion such as a halide, $b$ is 1 and $c$ is 2. As will be apparent from the above structural formula, the compounds described herein may be considered as substituted imidazoles. The imidazole ring is substituted at the 3-position by a 2-lower alkyl-4-amino-5-pyrimidinylmethyl radical. It is further substituted at the 1- and 2-positions by the same or different lower alkyl radical. The pyrimidine moiety also contains a lower aklyl group at the 2-position of the pyrimidine ring. The lower alkyl groups present in the pyrimidine and imidazole portions of these salts need not, of course, be the same in any particular compound.

With further regard to formula I, the anion (designated as X) may be an inorganic anion such as chloride, bromide, iodide, nitrate, sulfate, phosphate and the like, or the anion of an organic acid such as citric, tartaric, acetic, picric, stearic, succinic, benzoic, phthalic, phenoxyacetic, pamoic, abietic, 2-naphthalene sulfonic, or ethylene diamine tetraacetic acids. It may also be the anion of a polymer such as polyphosphate or polystyrenesulfonate. The nature of the anion is not critical and any anion may be employed as long as it is not unduly toxic for the poultry. However, the anions of the mineral acids and strong organic acids are preferred. It will be realized by those skilled in this art that an acid addition salt of the primary amino group present in these compounds will also be formed concurrently with the quaternary salt. Accordingly, it is to be understood that the expression "quaternary salt" is being used in this specification and claims to mean the acid addition salt of such quaternary salt.

The compounds of this invention are prepared by reacting an acid addition salt of an ester of a 2-lower alkyl-4-amino-5-hydroxymethyl pyrimidine and a strong acid with a 1,2-dilower alkyl imidazole compound. According to the preferred process, an acid addition salt of an ester of a 2-lower alkyl-4-amino-5-hydroxymethyl pyrimidine and a hydrohalic acid is reacted directly with the substituted imidazole. This process may be represented as follows:

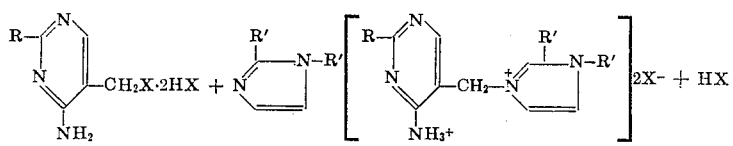

where R is a lower alkyl radical, R' is a lower alkyl radical and X is a halogen, such as chlorine or bromine.

Although the proportions of reactants are indicated to be equimolar in the above equation such proportions are not critical and an excess of either reactant can also be suitably reacted. Preferably, however, an excess of the substituted imidazole reactant is employed.

The reaction is preferably carried out in the presence of an organic solvent which is inert under the reaction conditions, such as acetonitrile and the N,N-diloweralkyl alkanoamides. Other solvents such as methanol, ethanol, propanol and the like can also be employed. The reaction temperature is not critical and it is preferred to carry out the process at about room temperature. At room temperature the reaction is generally complete after from 5–20 hours or more according to the concentration of reactants and particular reactants employed. However, appreciable amounts of the product are obtained after a short period of time. The products precipitate out from the reaction mixture on standing at room temperature or on the addition of a suitable precipitant such as ether, ethyl acetate and the like and can be recovered by filtration or other conventional techniques.

The acid addition salt of the 5-hydroxymethyl pyrimidine esters of hydrohalic acids, i.e. the halomethyl pyrimidine dihydrohalides, are preferably employed for reaction with the substituted imidazoles. However, the quaternization may also be brought about employing the acid addition salt of the 5-hydroxymethyl pyrimidine esters of strong organic acids such as the methyl sulfinate, p-toluenesulfonate, benzene sulfonate and naphthalene sulfonate esters.

The quaternization may be conducted so that the particular salt desired is obtained directly or the quaternary salt recovered from the reaction medium may be conveniently metathesized to the desired salt by techniques known in the art.

Among the 3-(2-lower alkyl-4-amino-5-pyrimidinylmethyl)-1-substituted imidazolium quaternary salts which may be formed according to the present invention are the 3-(2-methyl-4-amino-5-pyrimidinylmethyl)-1,2-dimethyl imidazolium salts, 3-

(2-methyl-4-amino-5-pyrimidinylmethyl)-1,2-diethyl imidazolium salts, 3-(2-ethyl-4-amino-5-pyrimidinylmethyl)-1,2-dimethyl imidazolium salts, 3-(2-ethyl-4-amino-5-pyrimidinylmethyl)-1,2-diethyl imidazolium salts, 3-(2-n-pyropyl-4-amino-5-pyrimidinylmethyl)-1,2-dimethyl imidazolium salts, and 3-(2-n-butyl-4-amino-5-pyrimidinylmethyl)-1,2-diethyl imidazolium salts.

As previously indicated herein, the compounds of this invention are useful in the treatment and prevention of coccidiosis in poultry. These compounds are conveniently fed to poultry as a component of the feed of the animals although they may also be given dissolved or suspended in the drinking water. The animals can also be given a composition containing the quaternary salts intimately dispersed in or admixed with an inert carrier or diluent. By an inert carrier is meant one that is non-reactive with respect to the quaternary and that may be administered with safety to the animals. The carrier or diluent is preferably one that is or may be an ingredient of the animal feed. Composition formulations containing from about 1 percent to about 40 percent by weight, and preferably from about 2–25 percent by weight of active ingredient are particularly suitable for addition to poultry feeds, and compositions containing from about 5–15 percent by weight of coccidiostat are very satisfactory.

Examples of typical feed supplements containing a imidazolium quaternary salt dispersed in a solid inert carrier are:

A.
183-(2-methyl-4-amino-5-pyrimidinylmethyl)-1,2-dimethyl imidazolium bromide hydrobromide Wheat standard middlings    6.0
                                                                                                                    94.0

B.
183-(2-ethyl-4-amino-5-pyrimidinylmethyl)-1,2-dimethyl imidazolium bromide hydrobromide Corn distillers' dried grains  10.0
                                                                                                                       90.0

C.
183-(2-n-propyl-4-amino-5-pyrimidinylmethyl)-1,2-dimethyl imidazolium bromide hydrobromide Molasses solubles    12.0
                                                                                                               88.0

These and similar feed supplements are prepared by uniformly mixing the imidazolium quaternary salt with the carrier or carriers.

The feed supplements of the type illustrated hereinabove are usually further diluted with materials such as corn meal or soybean meal before being incorporated in the animal feed. In this intermediate processing step the level of coccidiostat in the carrier is brought down to from about 0.1 percent to about 1.0 percent by weight. This dilution serves to facilitate uniform distribution of the substance in the finished feed. The finished feed is one that contains a source of fat, protein, carbohydrate, minerals, vitamins and other nutritional factors.

The amount of imidazolium quaternary salt required for optimum control of coccidiosis in poultry will, of course, vary somewhat with the specific compound or compounds employed. In general, the compounds of formula I are effective when administered in concentrations of about 0.001 to 0.003 percent in the diet.

The anticoccidial activity of the imidazolium quaternary salts is determined by feeding groups of straight run white leghorn chicks a ration containing graded concentrations of imidazolium quaternary compound and orally inoculating the birds with sporulated oocysts of the coccidia on the second day of the test. 50,000 oocysts of *E. tenella* are used. The birds are fed the medicated diet for a period of days (5–8), then weighed and sacrificed, and examined by reviewing oocysts and/or lesions due to coccidiosis. The activity of the imidazolium quaternary is expressed in terms of the weight percent concentration in the feed that provides the desired control of the infection.

The anticoccidial activity of representative compounds of this invention against *E. tenella* is as follows:

| Compound | E. tenella |
|---|---|
| 3-(4-amino-2-propyl-5-pyrimidinylmethyl)-1,2-dimethylimidazolium bromide hydrobromide | 0.0015 |
| 3-(4-amino-2-methyl-5-pyrimidinylmethyl)-1,2-dimethylimidazolium chloride hydrochloride | 0.0015 |
| 3-(4-amino-2-ethyl-5-pyrimidinylmethyl)-1,2-dimethylimidazolium bromide hydrobromide | 0.0015 |

Many of the imidazolium quaternary salts of this invention are desirably or advantageously administered to poultry by way of the drinking water of the birds. This method of treatment is often employed in the therapeutic use of our compounds since poultry with coccidiosis are apt to consume less solid feed than normal birds. The water-soluble quaternary salts may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat and preparations containing from 1–25 percent by weight of active compound are suitable.

The following examples are given for the purpose of illustration and not by way of limitation.

EXAMPLE 1

3-(4-Amino-2-propyl-5-pyrimidinylmethyl)-1,2-dimethylimidazolium bromide hydrobromide To a stirred suspension of 20 g. of 4-amino-5-bromomethyl-2-propylpyrimidine dihydrobromide in 100 ml. of acetonitrile is added 20 g. of 1,2-dimethylimidazole. After standing at room temperature for several hours, a small crop of 1,2-dimethylimidazole hydrobromide is removed. The mother liquor is heated for one hour on the steam bath and then diluted with 500 ml. of ether to precipitate a gum. The supernatant liquid is decanted and the gum is rubbed with acetone which is also decanted. The gum is dissolved in 25 ml. of 48 percent hydrobromic acid then diluted with acetone until crystallization of the product, 3-(4-amino-2-propyl)-5-pyrimidinylmethyl)-1,2-dimethylimidazolium bromide hydrobromide begins. The product weighs 9.8 g. and can be purified from methanolacetone. The melting point is 269°C. (dec.) for $C_{13}H_{20}N_5Br \cdot HBr$ Calc'd: C=38.34, H=5.20, N=17.20, Br=39.26
Found : C=38.95, H=5.31, N=17.38, Br=39.76.

EXAMPLE 2

3-(4-Amino-2-methyl-5-pyrimidinylmethyl)-1,2-dimethylimidazolium chloride hydrochloride.

The reaction is carried out with 4-amino-5-chloromethyl-2-methylpyrimidine dihydrochloride and 1,2-dimethylimidazole in acetonitrile. The process used is similar to that of Example 1 except that hydrochloric acid is used instead of hydrobromic acid. The pure product, 3-(4-amino-2-methyl-5-pyrimidinylmethyl)-1,2-dimethylimidazolium chloride hydrochloride, melts at 271°C. (decomp.) when crystallized from methanol-acetone, and analyzes as a dihydrate Calc'd for $C_{11}H_{16}N_5Cl \cdot HCl \cdot 2H_2O$ C=40.49, H=6.49, N=21.47, Found: C=40.13, H=5.54, N=21.76.

EXAMPLE 3

3-(4-Amino-2-ethyl-5-pyrimidinylmethyl)-1,2-dimethylimidazolium bromide hydrobromide.

The reaction conditions used are similar to those of Example 1, except that 4-amino-5-bromomethyl-2-ethyl pyrimidine dihydrobromide and 1,2-dimethylimidazole in acetonitrile are the reactants. The product, 3-(4-amino-2-ethyl-5-pyrimidinylmethyl)-1,2-dimethylimidazolium bromide hydrobromide is purified from methanol-acetone and melts at 279°C. (decomp.) for $C_{12}H_{18}N_5Br \cdot HBr$ Calc'd. C=36.66, H=4.87, N=17.82, Br=40.66
Found : C=36.45, H=4.93, N=18.06, Br=40.69.

EXAMPLE 4

When the process in Example 1 is repeated using 1,2-diethylimidazole reacted with 4-amino-5-bromomethyl-2-propylpyrimidine dihydrobromide, 4-amino-5-bromomethyl-2-methylpyrimidine dihydrobromide, and 4-amino-5-bromomethyl-2-ethylpyrimidine dihydrobromide, the products obtained are 3-(4-amino-2-propyl-5-pyrimidinylmethyl)-1,2-diethylimidazolium bromide hydrobromide; 3-(4-amino-2-methyl-5-pyrimidinylmethyl)-1,2-diethylimidazolium bromide hydrobromide, and 3-(4-amino-2-ethyl-5-pyrimidinylmethyl)-1,2-diethylimidazolium bromide hydrobromide, respectively.

EXAMPLE 5

When the process in Example 4 is repeated using 1-methyl-2-ethylimidazole, the products obtained are 3-(4-amino-2-propyl-5-pyrimidinylmethyl)-1-methyl-2-ethylimidazolium bromide hydrobromide; 3-(4-amino-2-methyl-5-pyrimidinylmethyl)-1-methyl-2-ethylimidazolium bromide hydrobromide, and 3-(4-amino-2-ethyl-5-pyrimidinylmethyl)-1-methyl-2-ethylimidazolium bromide hydrobromide respectively.

We claim:

1. A compound having the formula

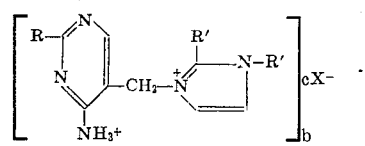

wherein R is methyl, ethyl, or propyl, R' is methyl, X is a halide anion, and $b$ and $c$ are positive numbers having values such that $b$ moles of cation are neutralized by $c$ moles of anion X.

2. The compound of claim 1 which is 3-(2-methyl-4-amino-5-pyrimidinylmethyl)-1,2-dimethyl imidazolium halide hydrohalide.

3. The compound of claim 1 which is 3-(2-ethyl-4-amino-5-pyrimidinylmethyl)-1,2-dimethyl imidazolium halide hydrohalide.

4. The compound of claim 1 which is 3-(2-n-propyl-4-amino-5-pyrimidinylmethyl)-1,2-dimethyl imidazolium halide hydrohalide.

* * * * *